US012615507B2

(12) United States Patent
Yu

(10) Patent No.: US 12,615,507 B2
(45) Date of Patent: Apr. 28, 2026

(54) METHOD FOR DIGITAL VEHICLE KEY SYNCHRONIZATION, ELECTRONIC DEVICE AND STORAGE MEDIUM

(71) Applicant: XIAOMI EV TECHNOLOGY CO., LTD., Beijing (CN)

(72) Inventor: Fan Yu, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 380 days.

(21) Appl. No.: 18/220,140

(22) Filed: Jul. 10, 2023

(65) Prior Publication Data

US 2024/0323673 A1     Sep. 26, 2024

(30) Foreign Application Priority Data

Mar. 21, 2023    (CN) .......................... 202310282520.5

(51) Int. Cl.
　*B60R 25/24*　　　　(2013.01)
　*H04W 8/20*　　　　(2009.01)
(52) U.S. Cl.
　CPC .............. *H04W 8/20* (2013.01); *B60R 25/24* (2013.01); *B60R 2325/101* (2013.01); *B60R 2325/205* (2013.01)
(58) Field of Classification Search
　CPC ......... H04W 8/20; H04W 12/04; H04W 4/40; H04W 12/06; H04W 12/08; H04W 4/80; H04W 12/50; H04W 4/48; H04W 12/126; H04W 12/041; B60R 25/24; B60R 2325/101; B60R 2325/205; B60R 25/00; B60R 25/31; G07C 9/00174; G07C 9/00309; G07C 9/00571; G07C 9/00857; G07C 9/00896; G07C 2009/00388; H04L 67/1095; H04L 67/12
See application file for complete search history.

(56) References Cited

FOREIGN PATENT DOCUMENTS

CN　　108540521 A　　9/2018
CN　　110549989 A　* 12/2019　............. B60R 25/24
(Continued)

OTHER PUBLICATIONS

Sun, Hong-jing. "Managing Method, Device and Equipment of The Vehicle Power Lock." CN 110549989 A, English Translation, ip.com (Year: 2019).*
(Continued)

*Primary Examiner* — Wesley L Kim
*Assistant Examiner* — Erkin Abdullaev
(74) *Attorney, Agent, or Firm* — Cozen O'Connor

(57) ABSTRACT

A method for digital vehicle key synchronization includes: monitoring first owner key creation state information matching vehicle key creation state information based on the vehicle key creation state information sent by a vehicle terminal; receiving an owner key creation request sent by a first user terminal before receiving the first owner key creation state information, and determining target owner key information based on the owner key creation request; and sending the target owner key information to the vehicle terminal, in which the target owner key information is configured to indicate the vehicle terminal to overwrite first owner key information corresponding to the vehicle key creation state information based on the target owner key information.

18 Claims, 4 Drawing Sheets monitoring first owner key creation state information matching vehicle key creation state information in response to the vehicle key creation state information sent by a vehicle terminal ⟞ S101 in response to receiving an owner key creation request sent by a first user terminal before receiving the first owner key creation state information, determining target owner key information based on the owner key creation request ⟞ S102 sending the target owner key information to the vehicle terminal, wherein the target owner key information is configured to indicate the vehicle terminal to overwrite first owner key information corresponding to the vehicle key creation state information based on the target owner key information ⟞ S103

(56)     References Cited

FOREIGN PATENT DOCUMENTS

| | | | | | |
|---|---|---|---|---|---|
| CN | 111163091 | A | * | 5/2020 | ........... H04L 9/3268 |
| CN | 111833488 | A | | 10/2020 | |
| CN | 112466013 | A | * | 3/2021 | ............. H04L 67/52 |
| CN | 113362504 | A | | 9/2021 | |
| CN | 114764956 | A | * | 7/2022 | ............. G06F 21/64 |
| WO | WO-2022016409 | A1 | * | 1/2022 | ............. B60R 25/24 |

OTHER PUBLICATIONS

Ye, Qiong-qing. "A Bluetooth Key of The Cloud Server and Communication Method Thereof." CN 111163091 A, English Translation, ip.com (Year: 2020).*
Zhu, Peng. "Digital Key Management Method, Device, System and Storage Medium." CN 112466013 A, English Translation, ip.com (Year: 2021).*
Fu, Jing-yi. "Vehicle Control Method, Device and Readable Storage Medium." CN 114764956 A, English Translation, ip.com (Year: 2021).*
Chen, Jiahui, et al. "Virtual Vehicle Key Management Method and System Based on Internet of Vehicles." WO-2022016409-A1, PE2E English Translation. (Year: 2022).*
Chinese Patent Application No. 202310282520.5, Office Action dated Feb. 2, 2024, 6 pages.
Chinese Patent Application No. 202310282520.5, English translation of Office Action dated Feb. 2, 2024, 7 pages.

* cited by examiner

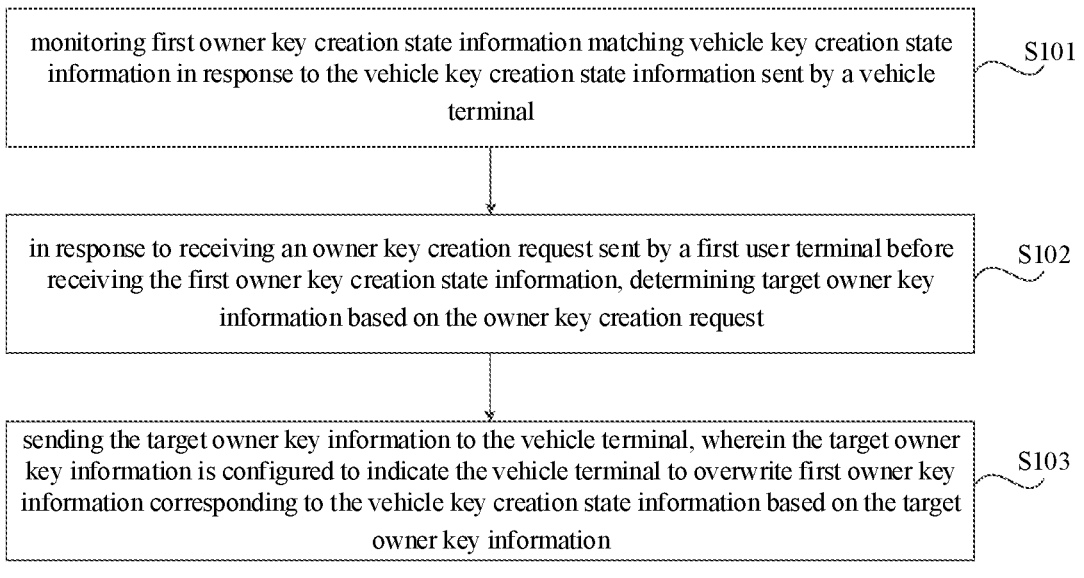

monitoring first owner key creation state information matching vehicle key creation state information in response to the vehicle key creation state information sent by a vehicle terminal ⟩ S101 in response to receiving an owner key creation request sent by a first user terminal before receiving the first owner key creation state information, determining target owner key information based on the owner key creation request ⟩ S102 sending the target owner key information to the vehicle terminal, wherein the target owner key information is configured to indicate the vehicle terminal to overwrite first owner key information corresponding to the vehicle key creation state information based on the target owner key information ⟩ S103

FIG. 1

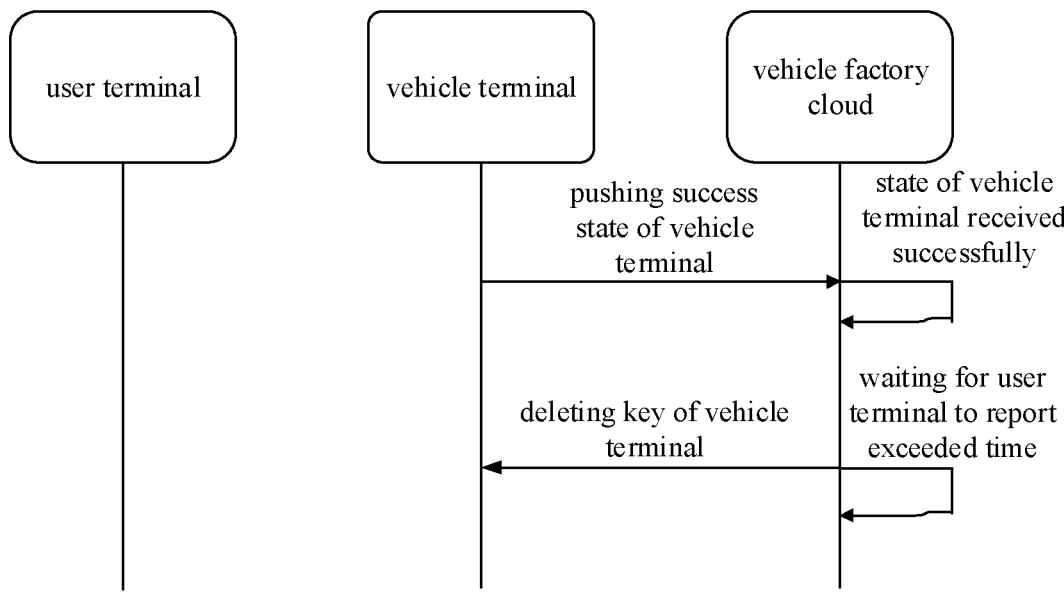

FIG. 2

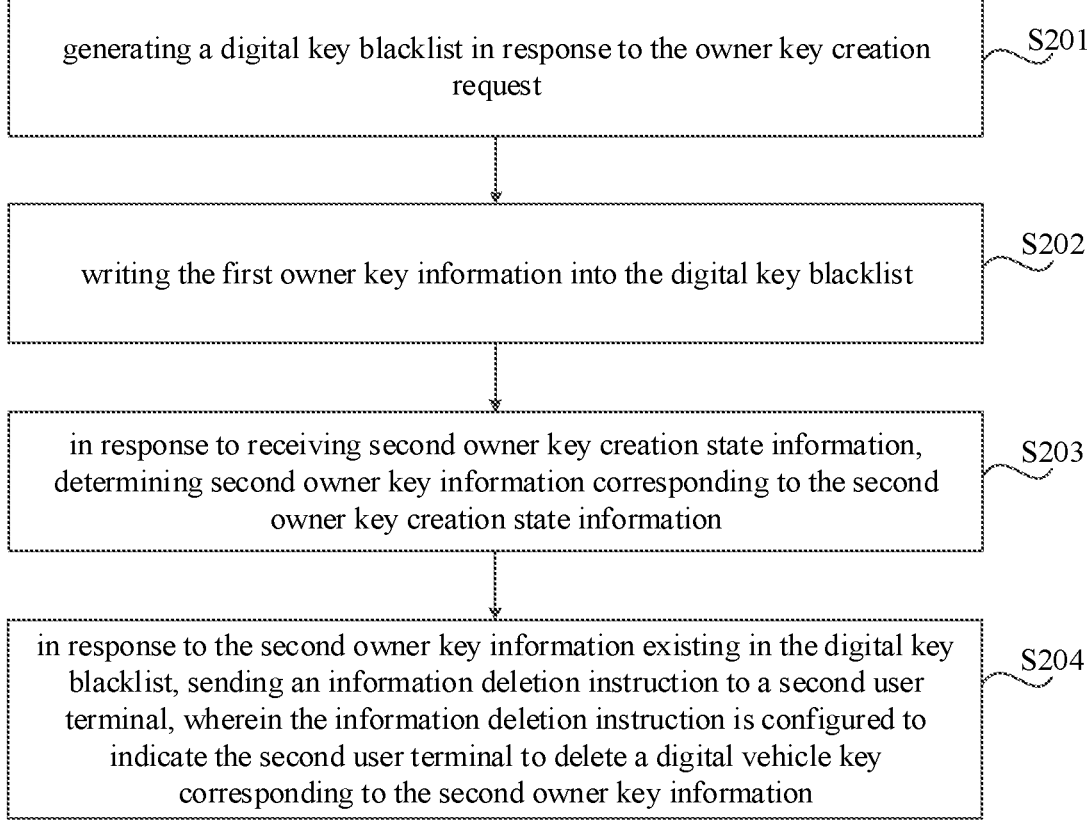

generating a digital key blacklist in response to the owner key creation request ~S201 writing the first owner key information into the digital key blacklist ~S202 in response to receiving second owner key creation state information, determining second owner key information corresponding to the second owner key creation state information ~S203 in response to the second owner key information existing in the digital key blacklist, sending an information deletion instruction to a second user terminal, wherein the information deletion instruction is configured to indicate the second user terminal to delete a digital vehicle key corresponding to the second owner key information ~S204

FIG. 3

METHOD FOR DIGITAL VEHICLE KEY SYNCHRONIZATION, ELECTRONIC DEVICE AND STORAGE MEDIUM

CROSS REFERENCE TO RELATED APPLICATION

This application is based on and claims priority to Chinese patent application No. 202310282520.5, filed on Mar. 21, 2023, the entire content of which is hereby incorporated into this application by reference.

TECHNICAL FIELD

The present disclosure relates to a field of vehicle technologies, and particularly to a method for digital vehicle key synchronization, an electronic device and a storage medium.

BACKGROUND

A Bluetooth digital vehicle key based on Bluetooth communication is very popular on various vehicle types. A process of creating a Bluetooth key between a mobile phone device and a vehicle is a prerequisite for normal usage of all Bluetooth digital vehicle key expansion functions.

SUMMARY

According to a first aspect of embodiments of the present disclosure, a method for digital vehicle key synchronization is provided. The method includes:

monitoring first owner key creation state information matching vehicle key creation state information based on the vehicle key creation state information sent by a vehicle terminal;

receiving an owner key creation request sent by a first user terminal before receiving the first owner key creation state information, and determining target owner key information based on the owner key creation request; and sending the target owner key information to the vehicle terminal, in which the target owner key information is configured to indicate the vehicle terminal to overwrite first owner key information corresponding to the vehicle key creation state information based on the target owner key information.

According to a second aspect of embodiments of the present disclosure, an electronic device is provided, and includes:

a processor; and a memory configured to store instructions executable by the processor;

in which, the processor is configured to:

monitor first owner key creation state information matching vehicle key creation state information based on the vehicle key creation state information sent by a vehicle terminal;

receive an owner key creation request sent by a first user terminal before receiving the first owner key creation state information, determine target owner key information based on the owner key creation request; and send the target owner key information to the vehicle terminal, in which the target owner key information is configured to indicate the vehicle terminal to overwrite first owner key information corresponding to the vehicle key creation state information based on the target owner key information.

According to a third aspect of embodiments of the present disclosure, a computer-readable storage medium with computer program instructions stored thereon is provided. The program instructions are configured to implement a method for digital vehicle key synchronization when executed by a processor. The method includes:

monitoring first owner key creation state information matching vehicle key creation state information based on the vehicle key creation state information sent by a vehicle terminal;

receiving an owner key creation request sent by a first user terminal before receiving the first owner key creation state information, and determining target owner key information based on the owner key creation request; and sending the target owner key information to the vehicle terminal, in which the target owner key information is configured to indicate the vehicle terminal to overwrite first owner key information corresponding to the vehicle key creation state information based on the target owner key information.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 1 is a flowchart illustrating a method for digital vehicle key synchronization according to an embodiment of the present disclosure.

FIG. 2 is a flowchart illustrating another method for digital vehicle key synchronization according to an embodiment of the present disclosure.

FIG. 3 is a flowchart illustrating a method for managing a digital vehicle key according to an embodiment of the present disclosure.

DETAILED DESCRIPTION

Figure 4:
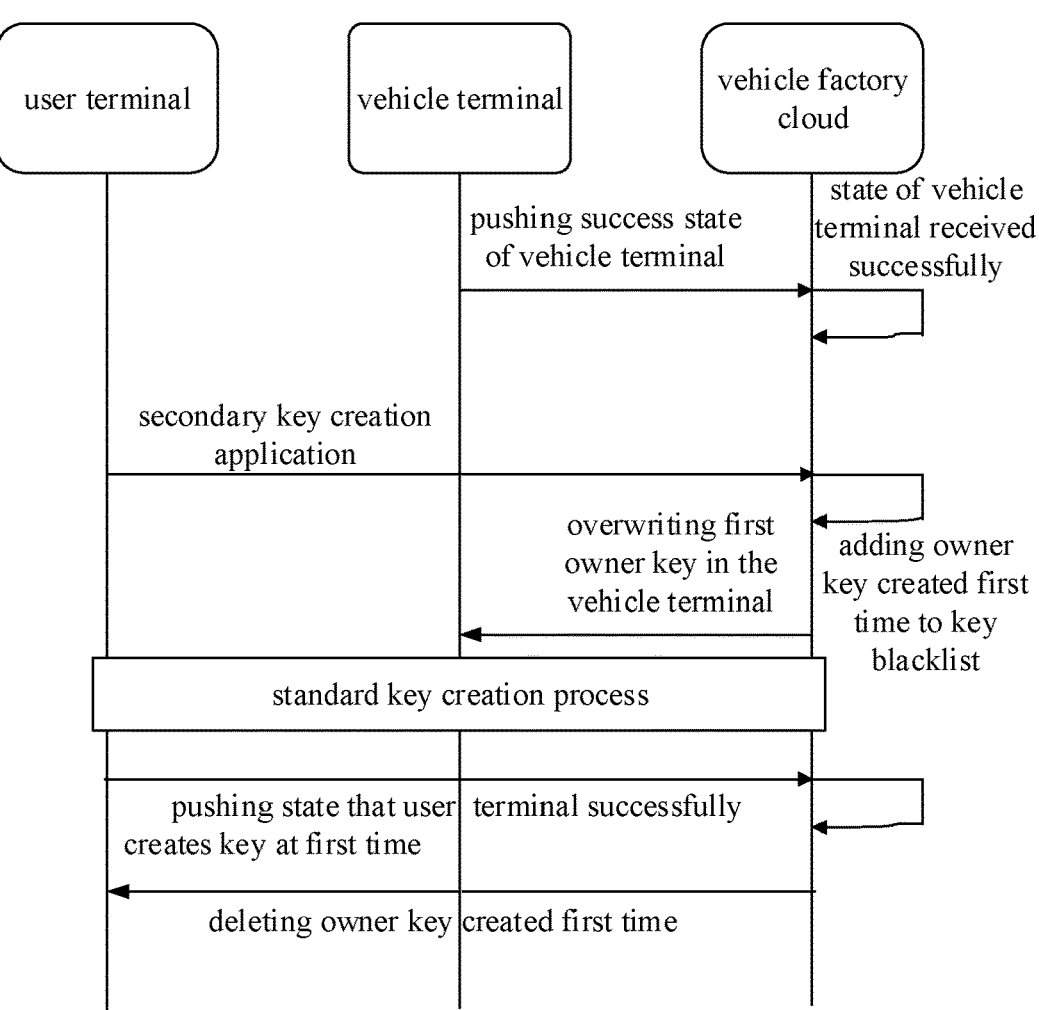
FIG. 4 is a flowchart illustrating yet another method for digital vehicle key synchronization according to an embodiment of the present disclosure.

The exemplary embodiments will be described in detail here, and examples thereof are shown in the accompanying drawings. When the following descriptions refer to the accompanying drawings, same numbers in different drawings represent same or similar elements unless otherwise indicated. The implementations described in the following exemplary embodiments do not represent all implementations consistent with the present disclosure. Rather, they are merely examples of apparatuses and methods consistent with some aspects of the disclosure as detailed in the appended claims.

It should be noted that, all actions for acquiring signals, information or data in the present disclosure are performed on the premise of conforming to data protection laws and regulations policy corresponding to a country of residence, and obtaining authorization by an owner of a corresponding apparatus.

In related arts, in a process of creating a Bluetooth digital vehicle key, possible scenarios of inconsistent key states among three ends of a vehicle, a mobile phone device and a vehicle factory cloud mainly includes the following two categories, each of which further includes two specific subdivision scenarios.

1. One scenario includes that the vehicle factory cloud only receives a notification message of key creation success from the vehicle, and further includes the following specific subdivision scenarios.

1.1. One subdivision scenario includes that the vehicle successfully creates the key and pushes a key creation success state to the vehicle factory cloud, and the mobile phone device fails to create the key and pushes a key creation failure state to the vehicle factory cloud.

1.2. Another subdivision scenario includes that the vehicle successfully creates the key and pushes the key creation success state to the vehicle factory cloud, while a process of pushing a key creation state from the mobile phone device to the vehicle factory cloud is failed, rendering that the vehicle factory is unknown to the key creation state of the mobile phone device.

2. Another scenario includes that the vehicle factory cloud only receives a notification message of key creation success from the mobile phone device, and further includes the following specific subdivision scenarios.

2.1. One subdivision scenario includes that the mobile phone device successfully creates the key and pushes a key creation success state to the vehicle factory cloud, and the vehicle fails to create the key and pushes a key creation failure state to the vehicle factory cloud.

2.2. Another subdivision scenario includes that the mobile phone device successfully creates the key and pushes the key creation success state to the vehicle factory cloud, while a process of pushing a key creation state from the vehicle to the vehicle factory cloud is failed, rendering that the vehicle factory is unknown to the key creation state of the vehicle.

Based on the scenarios where key states of the vehicle, the mobile phone device and the vehicle factory cloud are inconsistent due to the above communication error, the related arts may provide a universal and reliable solution for most of the scenarios, while for the above scenario 1.2, in the related art, the vehicle factory cloud is required to wait for the key creation state of the mobile phone terminal for a duration, rendering that the vehicle factory cloud is unable to initiate a new key creation request based on a same owner key, and a user experience of the digital vehicle key is reduced.

In view of these scenarios, a method for digital vehicle key synchronization is provided in the present disclosure. FIG. 1 is a flowchart illustrating a method for digital vehicle key synchronization according to an embodiment of the present disclosure. As illustrated in FIG. 1, the method is applicable to a cloud server, and includes the following blocks.

At block S101, first owner key creation state information matching vehicle key creation state information is monitored in response to the vehicle key creation state information sent by a vehicle terminal.

It is worth mentioning that a fixed physical vehicle key is required to achieve on and off of a vehicle in the related art, and the physical vehicle key is generally small for convenience of carrying by a user. However, the convenience of the physical vehicle key easily results in loss of the physical vehicle key, so that the user cannot turn on the vehicle when needing to use the vehicle. Therefore, in an embodiment, in order to facilitate traveling of the user, the user may install a digital vehicle key on a portable user terminal (for example, a mobile phone, a personal computer, an electronic watch, a tablet computer, etc.), bind the user terminal with the vehicle terminal through related software control, and turn on or off the vehicle by operating the user terminal based on a binding relationship. As such, the user terminal may achieve a function of the vehicle key. The vehicle terminal is a vehicle computer mounted on the vehicle, and the vehicle computer is configured to process a digital signal on the vehicle, and may send communication data to a vehicle factory cloud via a vehicle-cloud link, and may further establish a communication interaction with the user terminal by means of Bluetooth communication. As a binding relationship between the user terminal and the vehicle increases, the vehicle factory cloud server is required to store a correspondence between the user terminal and the vehicle terminal, and the user terminal may manage vehicle keys of a same vehicle through the vehicle factory cloud server. For example, the user terminal may issue a temporary vehicle key to other user terminals based on a control authority of an owner on the vehicle terminal, and other users may achieve temporary vehicle driving control based on the temporary vehicle key.

It should be noted that, in an embodiment, in order to prevent the vehicle from being randomly used by other temporary users due to management disorder for the same vehicle terminal, the same vehicle terminal may only be configured with one owner, and correspondingly, the digital vehicle key corresponding to the owner may only be configured in one user terminal, and temporary vehicle usage authorities of other user terminals require to be authorized to other temporary users by the user terminal corresponding to the owner via the vehicle factory cloud. In a process of configuring the digital vehicle key of the vehicle, the user is required to establish a digital pairing with the vehicle terminal based on the user terminal. For example, in an embodiment, a wireless communication may be performed between the user terminal and the vehicle terminal based on Bluetooth, and in a process of establishing the digital pairing, a unique correspondence between the vehicle terminal and the user terminal is established based on a unique identifier of the user terminal (for example, communication ID information of the user terminal, etc.) and a unique identifier of the vehicle terminal (for example, engine number information of the vehicle, etc.), digital vehicle key information corresponding to the correspondence is generated based on the correspondence, and the digital vehicle key information is stored in the vehicle terminal and the user terminal. When the digital vehicle key information is generated, the vehicle terminal is required to report a key creation state of the vehicle to the vehicle factory cloud via a vehicle-cloud communication link, and the user terminal is also required to report a key creation state at the owner end to the vehicle factory cloud via an Internet communication link. When receiving the key creation state reported by the vehicle terminal and the key creation state reported by the user terminal, the vehicle factory cloud matches the above two creation states, and provides feedback to both of the vehicle terminal and the user terminal on a synchronization creation success signal when determining that the creation states are consistent. Each of the vehicle terminal and the user terminal receives the signal, and the user terminal may control on and off of the vehicle based on the digital vehicle key.

For example, in an embodiment, when the digital vehicle key in the vehicle factory cloud, the digital vehicle key in the vehicle terminal and the digital vehicle key in the user terminal are synchronized, the vehicle terminal may turn on or turn off the vehicle based on the digital vehicle key; and synchronism of the digital vehicle keys at three ends of the vehicle factory cloud, the vehicle and the user terminal may be determined by the vehicle factory cloud. This embodiment may be applicable for the vehicle factory cloud. When matching and key creation of the digital vehicle key between the vehicle terminal and the user terminal are completed, the vehicle key creation state information of the vehicle terminal is sent to the vehicle factory cloud via the vehicle-cloud communication link, such that a current vehicle key creation state of the vehicle is reported to the vehicle factory cloud. The vehicle key creation state information may include vehicle key creation successful, vehicle key creation failed, vehicle key in creation, and other information. It is worth mentioning that, a communication mode between the vehicle terminal and the vehicle factory cloud in this embodiment is a proprietary vehicle-cloud communication link based on wireless communication, and the vehicle-cloud communication link is a local area network, which may avoid a communication interference, rendering the vehicle factory cloud to quickly receive state information sent by the vehicle terminal. And a digital communication is performed between the user terminal and the vehicle factory cloud via the Internet, and the user terminal cannot send owner key creation state information to the vehicle factory cloud in time when there are a plurality of network elements between the user terminal and the vehicle plant and interferences of communication links, or a communication signal of the user terminal is unstable, so that the digital vehicle key in the vehicle factory cloud cannot be synchronously corrected.

When receiving the vehicle key creation state information sent by the vehicle terminal, the vehicle factory cloud monitors first owner key creation state information sent by a first user terminal based on the information. It is worth mentioning that, in an embodiment, the vehicle key creation state information reported by the vehicle terminal includes ID information of the vehicle terminal and the user terminal. Therefore, it is possible to monitor whether the vehicle factory cloud receives the corresponding first owner key creation state information based on the vehicle key creation state information.

FIG. 2 is a flowchart illustrating another method for digital vehicle key synchronization according to an embodiment of the present disclosure. As illustrated in FIG. 2, after block S101, the method further includes:

in response to not receiving the first owner key creation state information within a preset time, generating a digital key deletion instruction; and sending the digital key deletion instruction to the vehicle terminal, in which the digital key deletion instruction is configured to indicate the vehicle terminal to delete the first owner key information.

For example, in an embodiment, the vehicle factory cloud starts timing when receiving the vehicle key creation state information sent by the vehicle terminal, and monitors the first owner key creation state information sent by the user terminal to the vehicle factory cloud after the user terminal creates the digital vehicle key. When the first owner key creation state information is not received within the preset time, the digital key deletion instruction is generated. The digital key deletion instruction is sent to the vehicle terminal, and the vehicle terminal deletes the first owner key information in the vehicle terminal based on the digital key deletion instruction. When the vehicle factory cloud receives the first owner key information sent by the user terminal generated in a process of creating the digital vehicle key for the first time, in order to avoid information of three ends being not synchronized, the digital key deletion instruction is sent to the user terminal, to delete the digital vehicle key in the user terminal. Therefore, the digital vehicle key that is not successfully synchronized between the vehicle terminal and the user terminal are cleared through the deletion instruction, and digital vehicle key records at the three ends are cleared, which may avoid inability to create a new digital vehicle key at the three ends due to an impact of the existing digital vehicle key on a newly established digital vehicle key in the next process of creating the digital vehicle key.

At block S102, in response to receiving an owner key creation request sent by a first user terminal before the first owner key creation state information, target owner key information is determined based on the owner key creation request.

For example, in an embodiment, in a process of monitoring the first owner key creation state information generated by the first user terminal during creating the digital vehicle key, when the vehicle factory cloud receives the owner key creation request sent by other user terminals or the first user terminal, it indicates that the user is under a certain communication barrier, for example, the user terminal is unable to send communication information to the vehicle factory cloud server due to lack of data traffic; the user terminal is powered off due to an insufficient power supply; the user terminal cannot be transmit related communication information to the vehicle factory cloud in time due to congestion in a current communication link of the user terminal. When the first user terminal cannot send the corresponding first owner key creation state information to the vehicle factory cloud server, and the user needs to use the vehicle, the owner key creation request is sent to the vehicle factory cloud by means of other user terminals or the first user terminal. It is worth mentioning that the owner key creation state information in this embodiment is configured to report a creation state of the digital vehicle key between the user terminal and the vehicle terminal to the vehicle factory cloud, and the owner key creation request is configured to report an application request for recreating the digital vehicle key to the vehicle factory cloud. After receiving the owner key creation request, the vehicle factory cloud determines the target owner key information to be created by the user terminal based on the owner key creation request.

Optionally, in an implementation, the above block S102 may include:

determining vehicle identity information of the vehicle terminal and user identity information of the first user terminal based on the owner key creation request; and generating the target owner key information based on the vehicle identity information and the user identity information.

It is worth mentioning that, in an embodiment, the owner creation request includes the vehicle identity information of the vehicle terminal and the user identity information of the first user terminal that sends the owner key creation request. The vehicle terminal herein is consistent with the vehicle terminal that reports the vehicle key creation state information to the vehicle factory cloud. For example, in order to avoid disorder in a correspondence between the vehicle and the user terminal, each of the vehicle key creation state information, the owner key creation state information and the owner key creation request includes the vehicle identity information of the corresponding vehicle terminal and the user identity information of the user terminal. The vehicle identity information is configured to uniquely identify the vehicle terminal, and the user identity information is configured to uniquely identify the user terminal. Therefore, the target owner key information may be generated according to the user identity information and the vehicle identity information based on a preset edition rule.

At block S103, the target owner key information is sent to the vehicle terminal. The target owner key information is configured to indicate the vehicle terminal to overwrite first owner key information corresponding to the vehicle key creation state information based on the target owner key information.

It is worth mentioning that, in an embodiment, when the vehicle factory cloud generates the target owner key information, the digital vehicle key in the user terminal and the digital vehicle key in the vehicle factory cloud may be synchronized. Therefore, the target owner key information is required to be synchronized to a corresponding vehicle terminal. For example, the target owner key information includes the vehicle identity information of the vehicle terminal, and the vehicle factory cloud may send the target owner key information to the vehicle terminal via wireless communication based on the vehicle identity information. The vehicle terminal deletes the first owner key information corresponding to the vehicle key creation state information in the vehicle terminal after receiving the target owner key information, and generates the digital vehicle key based on the target owner key information, thus achieving synchronization of the digital vehicle key among the vehicle factory cloud, the vehicle terminal and the user terminal.

On the basic of the above method, the first owner key creation state information matching vehicle key creation state information is monitored in response to the vehicle key creation state information sent by a vehicle terminal, in response to receiving the owner key creation request sent by a first user terminal before receiving the first owner key creation state information, the target owner key information is determined based on the owner key creation request, and the target owner key information is sent to the vehicle terminal. The target owner key information is configured to indicate the vehicle terminal to overwrite the first owner key information corresponding to the vehicle key creation state information based on the target owner key information. Therefore, a mechanism that a cloud server triggers vehicle key overwriting is introduced, rendering that the vehicle terminal may overwrite with a synchronized digital vehicle key based on the key creation request, thus achieving digital vehicle key synchronization among the vehicle terminal, the cloud server and the user terminal, and improving a user experience of the owner in the process of creating the digital vehicle key.

FIG. 3 is a flowchart illustrating a method for managing a digital vehicle key according to an embodiment of the present disclosure. As illustrated in FIG. 3, the method may be performed by a vehicle factory cloud, and include the following blocks.

At block S201, a digital key blacklist is generated in response to the owner key creation request.

At block S202, the owner key information is written into the digital key blacklist.

For example, in an embodiment, when the vehicle factory cloud receives the owner key creation request sent by the user terminal, the digital key blacklist is generated in the vehicle factory cloud. The digital key blacklist is configured to record a deprecated digital vehicle key corresponding to the vehicle terminal. When the vehicle factory cloud receives the key creation request sent by the user terminal, it indicates that the user is intended to deprecate the digital vehicle key recorded in the vehicle terminal and the vehicle factory cloud due to a certain reason, and recreate a new digital vehicle key in the vehicle factory cloud based on a new key creation request. Therefore, when the digital key blacklist is generated in the vehicle factory cloud, the first owner key information corresponding to the vehicle key creation state information is written into the digital key blacklist.

At block S203, in response to receiving second owner key creation state information, second owner key information corresponding to the second owner key creation state information is determined.

At block S204, in response to the second owner key information existing in the digital key blacklist, an information deletion instruction is sent to a second user terminal. The information deletion instruction is configured to indicate the second user terminal to delete a digital vehicle key corresponding to the second owner key information.

It is worth mentioning that, in an embodiment, when the digital vehicle key in the vehicle terminal, the digital vehicle key in the vehicle factory cloud server and the digital vehicle key in the user terminal are synchronized, the vehicle factory cloud server, in response to receiving the second owner key creation state information, determines corresponding second owner key information based on the second owner key creation state information. The vehicle factory cloud server retrieves the second owner key information in the digital key blacklist, and when the second owner key information exists in the digital key blacklist, sends the deletion instruction to a second user terminal, to indicate the second user terminal to delete the digital vehicle key corresponding to the second owner key information, thus avoiding disorder of the digital vehicle keys in the vehicle terminal, the user terminal and the vehicle factory cloud.

Optionally, in an implementation, after the above block S203, the method includes:

determining key identity information corresponding to the second owner key information based on the second owner key information; and in response to the key identity information existing in the digital key blacklist, determining that the second owner key information exists in the digital key blacklist.

For example, in an embodiment, the corresponding key identity information may be determined based on the user terminal identity information and the vehicle identity information in the owner key information. The key identity information is retrieved in the digital key blacklist. When the key identity information exists in the digital key blacklist, it is determined that the second owner key information exists in the digital key blacklist.

With the above solution, a cloud key blacklist mechanism is introduced in the vehicle factory cloud, which may ensure that even if there is a delayed notification of successful creation of the key for the first time, the key state may still be accurately determined, and further ensure that key creation states of the three ends are consistent by deleting the digital vehicle key on the owner user terminal created the key for the first time, and improve an overall user experience.

FIG. 4 is a flowchart illustrating a method for digital vehicle key synchronization according to an embodiment of the present disclosure. As illustrated in FIG. 4, the method includes the following blocks.

At block 1, when a vehicle terminal completes digital vehicle key creation of a Bluetooth node, the vehicle terminal sends vehicle key creation state information to a vehicle factory cloud via a vehicle-cloud communication link.

At block 2, the vehicle factory cloud enters a waiting state for receiving owner key creation state information corresponding to an owner user terminal.

At block 3, when the vehicle factory cloud receives an authenticated secondary owner key creation request from another user terminal or a same user terminal before receiving a push of the owner key creation state information sent by the user terminal, a digital vehicle key blacklist is established in the vehicle factory cloud, and digital vehicle key information (for example, a key ID) during creating the owner key for the first time is placed in the blacklist.

At block 4, the vehicle factory cloud continues executing the secondary owner key creation request, and sends an owner key overwrite request to the vehicle terminal, and the vehicle terminal creates a new owner key again to overwrite an old owner key after receiving the owner key overwrite request.

At block 5, when the system with three ends jointly completes a complete process of creating the owner key for the second time, synchronization of owner key creation states in the vehicle terminal, the user terminal and the vehicle factory cloud is achieved.

At block 6, when the vehicle factory cloud receives a delayed notification of key creation success sent by the owner user terminal for creating the owner key for the first time due to some reasons after successfully creating the key the second time, the vehicle factory cloud searches for the key information in the key blacklist, and when the key information is successfully found, the key in the notification of the key creation success is determined as a deprecated key.

At block 7, when the vehicle factory cloud determines that the key in a certain received notification of key creation success from the mobile phone terminal of the owner is the deprecated key, a request is sent to the user terminal to delete the key at the mobile phone terminal of the owner.

In this way, a mechanism that a cloud server triggers vehicle key overwriting and a cloud key blacklist mechanism are introduced, which may avoid declining of the user experience of a Bluetooth vehicle key user due to unable to design an accurate exceeded time of the cloud, and further improve the overall user experience in the process of digital vehicle key creation.

Figure 5:
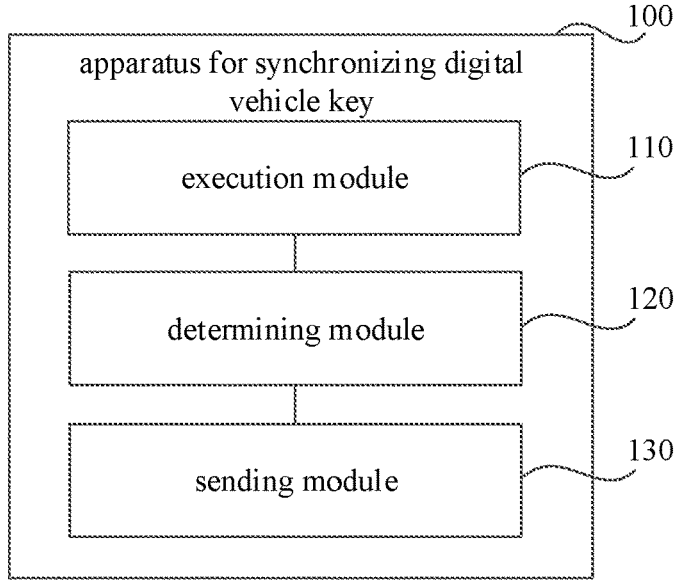
FIG. 5 is a block diagram illustrating an apparatus for digital vehicle key synchronization according to an embodiment of the present disclosure.

FIG. 5 is a block diagram illustrating an apparatus for digital vehicle key synchronization according to an embodiment of the present disclosure. As illustrated in FIG. 5, the apparatus 100 includes an execution module 110, a determining module 120 and a sending module 130.

The execution module 110 is configured to, monitor first owner key creation state information matching vehicle key creation state information in response to vehicle key creation state information sent by a vehicle terminal.

The determining module 120 is configured to, in response to receiving an owner key creation request sent by a first user terminal before receiving the first owner key creation state information, determine target owner key information based on the owner key creation request.

The sending module 130 is configured to send the target owner key information to the vehicle terminal. The target owner key information is configured to indicate the vehicle terminal to overwrite first owner key information corresponding to the vehicle key creation state information based on the target owner key information.

Optionally, the apparatus 100 includes a generation module. The generation module is configured to:

generate a digital key blacklist in response to the owner key creation request; and write the first owner key information into the digital key blacklist.

Optionally, the apparatus 100 includes a first determining module. The first determining module is configured to:

in response to receiving second owner key creation state information, determine second owner key information corresponding to the second owner key creation state information; and in response to the second owner key information existing in the digital key blacklist, send an information deletion instruction to a second user terminal. The information deletion instruction is configured to indicate the second user terminal to delete a digital vehicle key corresponding to the second owner key information.

Optionally, the apparatus 100 includes a second determining module. The second determining module is configured to:

determine key identity information corresponding to the second owner key information based on the second owner key information; and in response to the key identity information existing in the digital key blacklist, determine that the second owner key information exists in the digital key blacklist.

Optionally, the determining module 120 is configured to:

determine vehicle identity information of the vehicle terminal and user identity information of the first user terminal based on the owner key creation request; and generate the target owner key information based on vehicle identity information and the user identity information.

Optionally, the apparatus 100 further includes a deletion module. The deletion module is configured to:

in response to not receiving the first owner key creation state information within a preset time, generate a digital key deletion instruction; and send the digital key deletion instruction to the vehicle terminal. The digital key deletion instruction is configured to indicate the vehicle terminal to delete the first owner key information.

With regard to the apparatus in the above embodiments, the specific way in which each module performs the operation has been described in detail in the embodiments of the method and will not be elaborated here.

A computer readable storage medium with computer program instructions stored thereon is provided in the disclosure. The program instructions are configured to implement steps of the method for digital vehicle key synchronization provided in the present disclosure when executed by a processor.

Figure 6:
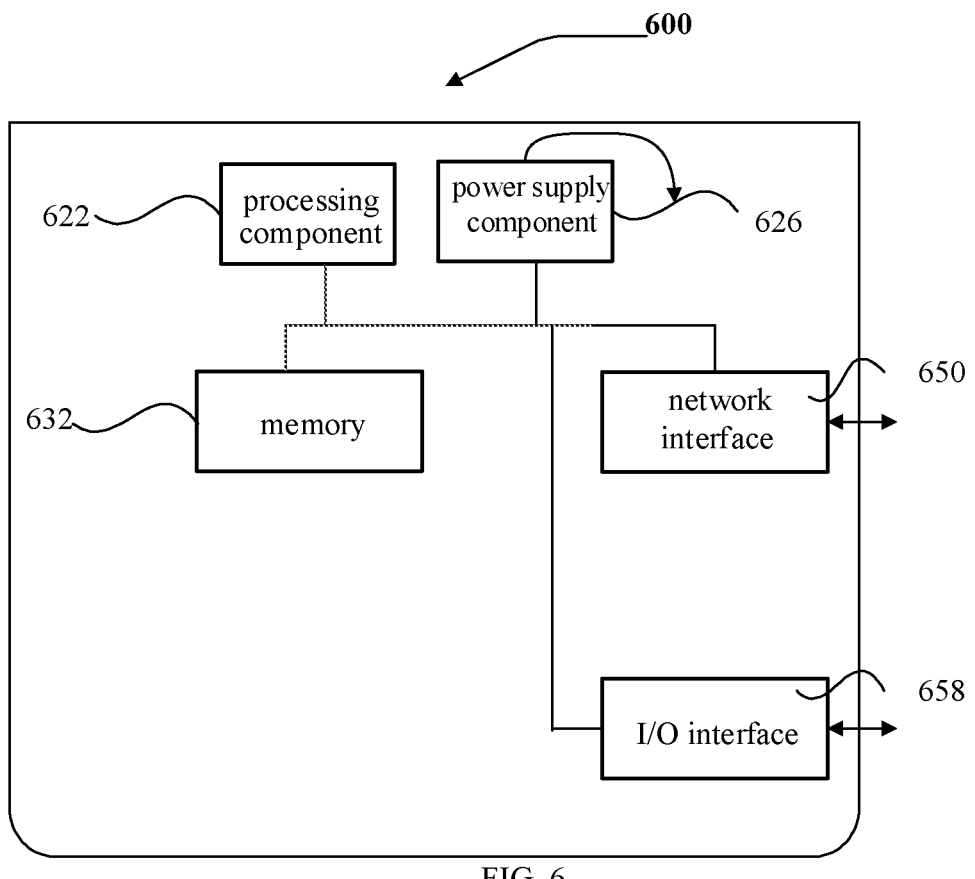
FIG. 6 is a block diagram illustrating an electronic device according to an example embodiment.

FIG. 6 is a block diagram illustrating an electronic device 100 according to an embodiment of the present disclosure. For example, the electronic device 600 may be provided as a server. As illustrated in FIG. 6, the electronic device 600 includes a processing component 622, which further includes one or more processors, and memory resources represented by a memory 632, which are configured to store instructions executed by the processing component 622, for example, an application. The application stored in the memory 632 may include one or more modules each of which corresponds to a set of instructions. In addition, the processing component 622 is configured to execute instructions, to perform the above method for digital vehicle key synchronization.

The electronic device 600 may further include one power supply component 626 configured to execute power management of the electronic device 600, and one wired or wireless network interface 650 configured to connect the electronic device 600 to a network, and one input/output(I/O) interface 658. The electronic device 600 may operate an operating system stored in the memory 632.

In another exemplary embodiment, a computer program product is further provided. The computer program product includes a computer program that may be executed by a programmable apparatus, and the computer program possesses a code part configured to execute the above method for digital vehicle key synchronization when executed by the programmable apparatus.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

The invention claimed is:

1. A method for digital vehicle key synchronization, comprising:
monitoring first owner key creation state information matching vehicle key creation state information based on the vehicle key creation state information sent by a vehicle terminal;
receiving an owner key creation request sent by a first user terminal before receiving the first owner key creation state information, and determining target owner key information based on the owner key creation request; and
sending the target owner key information to the vehicle terminal, wherein the target owner key information is configured to indicate the vehicle terminal to overwrite first owner key information corresponding to the vehicle key creation state information based on the target owner key information.

2. The method according to claim 1, further comprising:
generating a digital key blacklist based on the owner key creation request; and
writing the first owner key information into the digital key blacklist.

3. The method according to claim 2, further comprising:
receiving second owner key creation state information, and determining second owner key information corresponding to the second owner key creation state information; and
determining that the second owner key information exists in the digital key blacklist, and sending an information deletion instruction to a second user terminal, wherein the information deletion instruction is configured to indicate the second user terminal to delete a digital vehicle key corresponding to the second owner key information.

4. The method according to claim 3, further comprising:
determining key identity information corresponding to the second owner key information based on the second owner key information; and
determining that the key identity information exists in the digital key blacklist, and determining that the second owner key information exists in the digital key blacklist.

5. The method according to claim 1, wherein determining the target owner key information based on the owner key creation request comprises:
determining vehicle identity information of the vehicle terminal and user identity information of the first user terminal based on the owner key creation request; and
generating the target owner key information based on the vehicle identity information and the user identity information.

6. The method according to claim 1, further comprising:
generating a digital key deletion instruction in response to the first owner key creation state information being not received within a preset time; and
sending the digital key deletion instruction to the vehicle terminal, wherein the digital key deletion instruction is configured to indicate the vehicle terminal to delete the first owner key information.

7. An electronic device, comprising:
a processor; and
a memory configured to store instructions executable by the processor;
wherein, the processor is configured to:
monitor first owner key creation state information matching vehicle key creation state information based on the vehicle key creation state information sent by a vehicle terminal;
receive an owner key creation request sent by a first user terminal before receiving the first owner key creation state information, and determine target owner key information based on the owner key creation request; and
send the target owner key information to the vehicle terminal, wherein the target owner key information is configured to indicate the vehicle terminal to overwrite first owner key information corresponding to the vehicle key creation state information based on the target owner key information.

8. The electronic device according to claim 7, wherein, the processor is configured to:
generate a digital key blacklist based on the owner key creation request; and
write the first owner key information into the digital key blacklist.

9. The electronic device according to claim 8, wherein, the processor is configured to:
receive second owner key creation state information, and determine second owner key information corresponding to the second owner key creation state information; and
determine that the second owner key information exists in the digital key blacklist, and sending an information deletion instruction to a second user terminal, wherein the information deletion instruction is configured to indicate the second user terminal to delete a digital vehicle key corresponding to the second owner key information.

10. The electronic device according to claim 9, wherein, the processor is configured to:

determine key identity information corresponding to the second owner key information based on the second owner key information; and determine that the key identity information exists in the digital key blacklist, and determine that the second owner key information exists in the digital key blacklist.

11. The electronic device according to claim 7, wherein, the processor is configured to:

determine vehicle identity information of the vehicle terminal and user identity information of the first user terminal based on the owner key creation request; and generate the target owner key information based on the vehicle identity information and the user identity information.

12. The electronic device according to claim 7, wherein, the processor is configured to:

generate a digital key deletion instruction in response to the first owner key creation state information being not received within a preset time; and send the digital key deletion instruction to the vehicle terminal, wherein the digital key deletion instruction is configured to indicate the vehicle terminal to delete the first owner key information.

13. A non-transitory computer-readable storage medium with computer program instructions stored thereon, wherein the program instructions are configured to implement a method for digital vehicle key synchronization when executed by a processor, and the method comprises:

monitoring first owner key creation state information matching vehicle key creation state information based on the vehicle key creation state information sent by a vehicle terminal;

receiving an owner key creation request sent by a first user terminal before receiving the first owner key creation state information, and determining target owner key information based on the owner key creation request; and sending the target owner key information to the vehicle terminal, wherein the target owner key information is configured to indicate the vehicle terminal to overwrite first owner key information corresponding to the vehicle key creation state information based on the target owner key information.

14. The storage medium according to claim 13, wherein the method further comprises:

generating a digital key blacklist based on the owner key creation request; and writing the first owner key information into the digital key blacklist.

15. The storage medium according to claim 14, wherein the method further comprises:

receiving second owner key creation state information, and determining second owner key information corresponding to the second owner key creation state information; and determining that the second owner key information exists in the digital key blacklist, and sending an information deletion instruction to a second user terminal, wherein the information deletion instruction is configured to indicate the second user terminal to delete a digital vehicle key corresponding to the second owner key information.

16. The storage medium according to claim 15, wherein the method further comprises:

determining key identity information corresponding to the second owner key information based on the second owner key information; and determining that the key identity information exists in the digital key blacklist, and determining that the second owner key information exists in the digital key blacklist.

17. The storage medium according to claim 13, wherein determining the target owner key information based on the owner key creation request comprises:

determining vehicle identity information of the vehicle terminal and user identity information of the first user terminal based on the owner key creation request; and generating the target owner key information based on the vehicle identity information and the user identity information.

18. The storage medium according to claim 13, wherein the method further comprises:

generating a digital key deletion instruction in response to the first owner key creation state information being not received within a preset time; and sending the digital key deletion instruction to the vehicle terminal, wherein the digital key deletion instruction is configured to indicate the vehicle terminal to delete the first owner key information.

\* \* \* \* \*